United States Patent

Schwarz

[15] 3,665,245
[45] May 23, 1972

[54] QUADRUPOLE IONIZATION GAUGE

[72] Inventor: Helmut J. Schwarz, Simsbury, Conn.
[73] Assignee: Research Corporation, New York, N.Y.
[22] Filed: Oct. 27, 1969
[21] Appl. No.: 869,757

[52] U.S. Cl. .................315/111, 250/41.9 DS, 250/41.9 SB, 313/230, 324/33
[51] Int. Cl. .....................................................G01n 27/62
[58] Field of Search ...............324/33; 250/41.9 DS, 41.9 SB; 315/111; 313/230

[56] References Cited

UNITED STATES PATENTS

| | | | |
|---|---|---|---|
| 2,939,952 | 6/1960 | Paul et al. | 313/230 X |
| 3,244,969 | 4/1966 | Herb et al. | 324/33 |
| 3,371,205 | 2/1968 | Berry | 250/41.9 DS |

*Primary Examiner*—Roy Lake
*Assistant Examiner*—Siegfried H. Grimm

*Attorney*—Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

A non-magnetic ionization gauge or ion pump comprising a tube containing spaced cathodes at the same potential, with an intermediately positioned ring anode for setting up an oscillating stream of electrons that is focused or constrained within an axial path by an electric quadrupole lens arrangement which may be excited by the RF force. The quadrupole lenses create a field which is tuned firstly to lengthen and stabilize the path of the electrons thus causing greater ionization of the gas atoms in the tube, and also to expel the ions produced thereby, which ions are then collected by a cylindrical collector screen at a slightly negative potential surrounding the whole electrode structure. The collector current produced with this arrangement has been found to be approximately inversely proportional to the pressure within the range from $10^{-5}$ to $10^{-10}$ torr, so that collector currents of the order of microamperes can be obtained at very low pressure levels.

10 Claims, 9 Drawing Figures

PATENTED MAY 23 1972
3,665,245
SHEET 1 OF 2
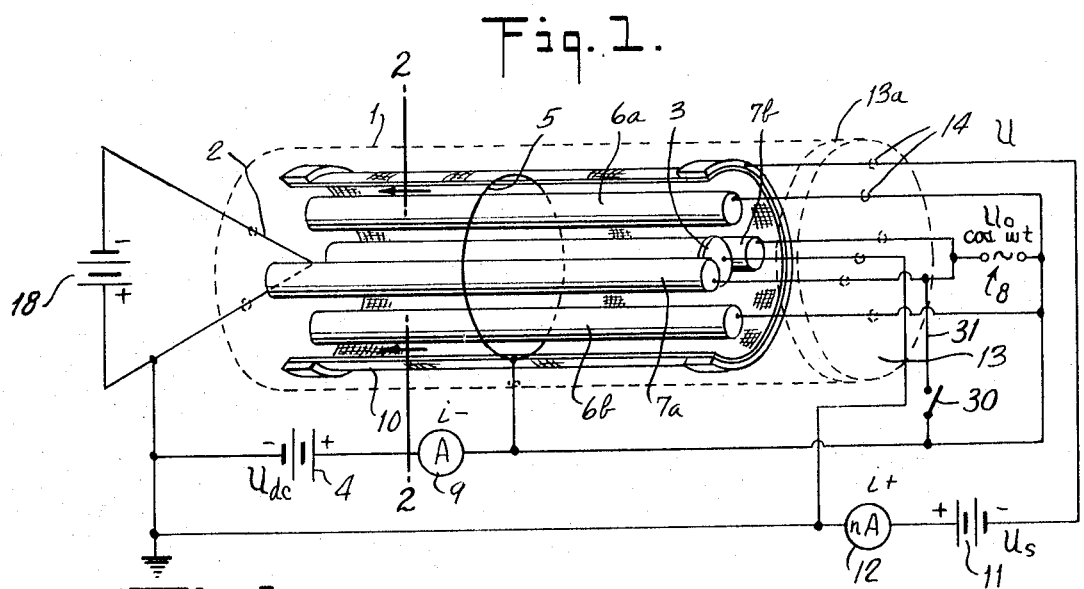
Fig. 1.
Fig. 1a.
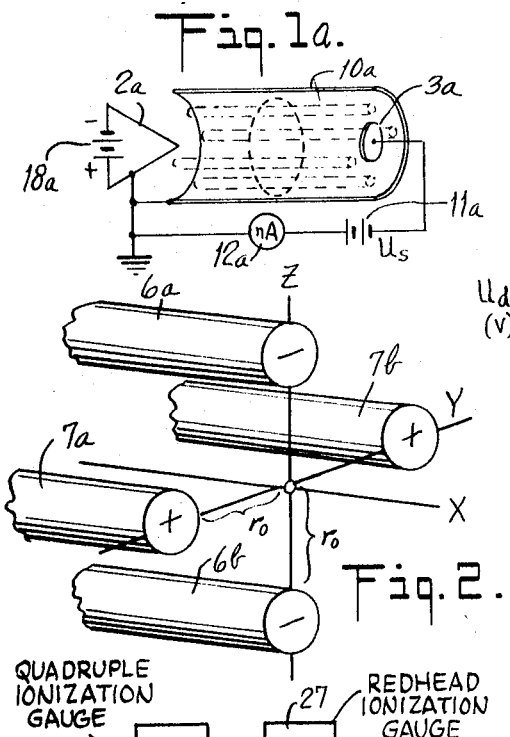
Fig. 2.
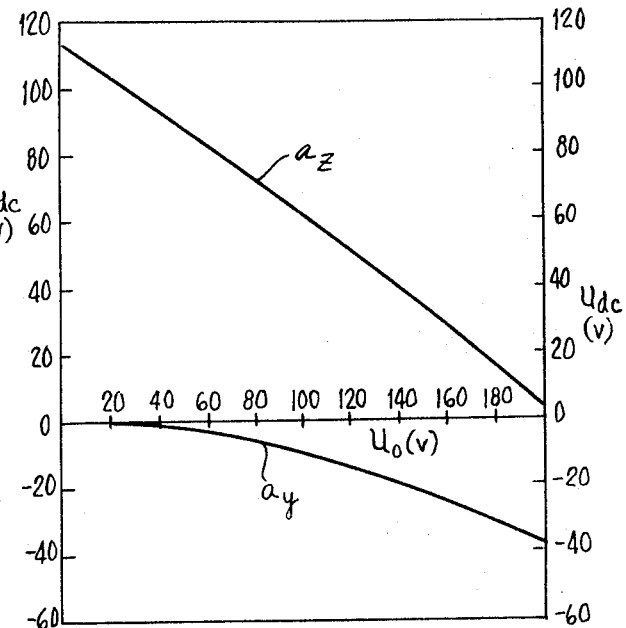
Fig. 3.
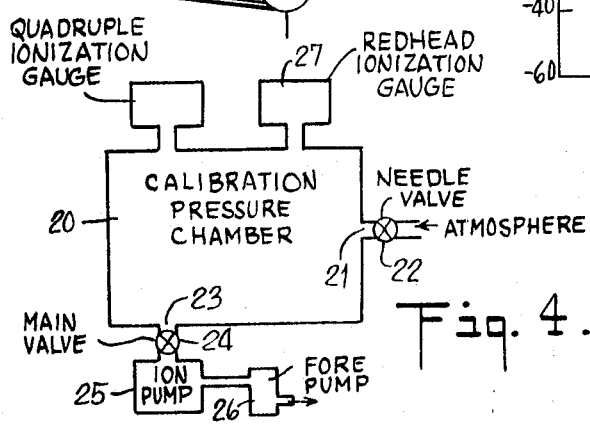
Fig. 4.
INVENTOR.
HELMUT J. SCHWARZ
BY
Thomas F. Moran
ATTORNEY

INVENTOR.
HELMUT J. SCHWARZ

QUADRUPOLE IONIZATION GAUGE

BACKGROUND OF THE INVENTION

The present invention relates to vacuum gauges of the ionization type and particularly to a non-magnetic ionization vacuum gauge or ion pump, using electric quadrupole focusing of the ionizing electron stream.

The creation and measuring of vacua by electron impact ionization of gas atoms present in a given enclosure has been known for some time. At present several ionization gauges of this type are available for measuring low pressures down to less than $10^{-11}$ torr, most of which utilize magnetic fields to increase the length of the electron path by spiralling thus raising the probability of electron-atom collision to improve the degree of ionization. However, all these gauges require a magnetic field in the order of 500 to 2,000 gauss, and the presence of a magnetic field in many measuring applications is undesirable, especially when working with the evaporation of magnetic materials to be laid down in thin films or in electron diffraction studies, particularly with low energies. In addition, the permanent magnets which are frequently used to produce the field are undesirable because of their weight.

Non-magnetic gauges of the orbitron type have been developed wherein the electrons are emitted somewhat off axis at the end of a cylindrical tube with an axial rod which is at positive potential. The immediate vicinity of the electron emitter is shielded against the rod so that the electrons do not go directly to the rod, but spiral around it. However, in these devices, the electron path cannot be increased as much as in a well-designed magnetic gauge and other features make them difficult to control. Many electrons are also lost by hitting the rod.

The present invention presents a gauge for measuring very low total gas pressures, particularly within the range of $10^{-5}$ to $10^{-10}$ torr, without the use of a magnetic field and which gauge is more sensitive at the low pressure range. In contrast to all other known ionization gauges, the collector current produced is almost inversely proportional to the pressure in this operational range.

SUMMARY OF THE INVENTION

The present invention embodies an ionization gauge or ion pump comprising an electrode structure having spaced cathodes at approximately the same potential, with an intermediately arranged ring anode for establishing an axially oscillating electron stream. The stream is acted upon by a field produced by a set of quadrupole electrodes, which may be electrostatic or also excited by a high frequency voltage, causing only electrons to stay within stable trajectories along the axis of the tube. The oscillating electrons, as a result of the strong quadrupole focusing, have a comparatively long path of travel, so that the number of ions produced by collisions will be much higher than in prior ionization gauges and the resulting ions will be expelled by the quadrupole field. The ions may be collected by a cylindrical collector screen, at a slightly negative potential, arranged to surround the whole electrode structure.

It has been found that with the present gauge using the cylindrical screen, the screen or collector current as a function of pressure follows the simple relationship $p \times i^n = $ const. at a given electron emission, where $n$ is a constant exponent of approximately 1.3 with $p$ as the pressure in torr and $i$ the collector current in amperes. Collector currents of the order of microamperes can be obtained at a pressure of $10^{-10}$ torr, so that the insulation problems involved with prior low pressure ionization gauges are obviated.

While the embodiment as above-described is preferred the gauge may be operated on other modes which are also of improved sensitivity over the prior art devices.

BRIEF DESCRIPTION OF THE DRAWINGS

FIG. 1 is a diagrammatic view of an ionization gauge constructed in accordance with the present invention;

FIG. 1a is a diagrammatic view of a modification of the gauge shown in FIG. 1;

FIG. 2 is a view of the quadrupole electrodes in section taken along the lines 2—2 in FIG. 1 and indicating the coordinate axes of the quadrupole field;

FIG. 3 is a plot of the stability limits of the quadrupole field of the ionization gauge of FIG. 1 for an electrode radius $r = 1$ cm. and a frequency of $\nu = 200$ MHz for the field;

FIG. 4 is a diagrammatic view of a vacuum system used in calibrating the gauge of the present invention;

DETAILED DESCRIPTION OF THE INVENTION

Figure 8:
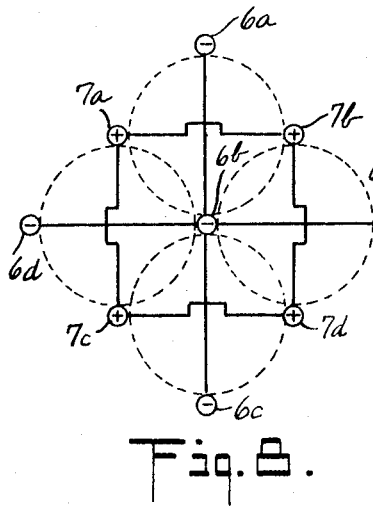
FIG. 8 is a diagrammatic view of a quadrupole electrode arrangement which may be used to construct a multicell ion pump.

An ionization gauge constructed in accordance with the present invention is shown diagrammatically in FIG. 1. The gauge comprises a cylindrical casing or tube 1 containing a hot cathode 2 and a reflector cathode 3, which are maintained at the same potential such as by connecting them to the negative terminal of a battery 4, or other power supply. The hot cathode 2, which may be in the form of a hot hairpin, heated by a DC power supply 18, emits electrons into the region between itself and the reflector cathode 3. A ring-type anode 5 is disposed in this region, intermediately between the hot cathode 2 and the reflector cathode 3, and is connected to the positive terminal of the battery 4, or other power supply, so as to accelerate the emitted electrons generally along the axis of the electrode arrangement. The accelerated electrons upon passing through the ring anode 5 will be decelerated and repelled by the negative potential on the reflector cathode 3 and will thus be caused to travel back and forth between the hot cathode 2 and reflector cathode 3 until they suffer a collision with the atoms of any gas present along the path within the casing 1.

The electrons are maintained within their path of oscillation by a quadrupole lens system comprising a set of quadrupole electrodes, in the form of rods 6a, 6b and 7a, 7b, positioned symmetrically about the path of electron travel. A DC potential equal to $U_{dc}$ of the ring anode 5, is applied to the rods such as by also connecting them to the positive terminal of the battery 4, or other power supply. In addition, an AC potential $U_o \cos \omega t$ of a comparatively high frequency, such as RF, may be applied between the pairs of opposite rods by connection with an AC power source or generator 8. In order to avoid transmission losses at the relatively high frequency, the two pairs of rods may be used as transmission lines. A simple amperemeter 9 may be inserted in the line on the side of the positive terminal of the battery 4 to measure the initial electron emission ($i^-$) prior to turning on the electric field.

When the quadrupole field is set up, all the ions resulting from the collision of the electrons with the gas atoms present along the path will be expelled by the quadrupole field and are collected by a cylindrical collector screen 10 which surrounds the entire electrode arrangement. The collector screen 10 acts as a shield and is maintained at a negative potential $U_s$ with respect to the cathodes 2 and 3 by means of a battery 11 or other power supply, so that the ions expelled by the field will be collected thereon and a suitable meter, such as an electrometer-type nanoammeter 12, is connected in series with the battery 11 to measure the resulting collector current ($i^+$).

All the electrodes, with the exception of the cathode 2, may be constructed from non-magnetic stainless steel and mounted on fixtures of aluminum oxide. The whole electrode structure may be mounted on a stainless steel flanged cap 13 having ceramic feedthroughs 14 for the electrical leads. The cap 13 is attached to the casing 1, which may be in the form of a stainless steel tube and the cap flange 13a may be tightened to the tube with a copper sealing ring (not shown).

QUADRUPOLE FIELD TUNING

In order to determine the proper operational parameters to produce the desired quadrupole focusing of the electrons, we must consider the relation of these parameters to the electric field. We will define the coordinates of the field as shown in FIG. 2; the X-coordinate being the axis of the casing 1 and the Z and Y coordinates passing through the centers of the opposite pairs of rods 6a, 6b and 7a, 7b, respectively. The electric field within the quadrupole electrodes is given by the equations:

$$E = -\text{grad}\left\{\frac{U_{dc} + U_0 \cos wt}{r_0^2}(y^2 - z^2)\right\} \quad (1)$$

$$-eE = m\frac{d^2y}{dt^2}j + m\frac{d^2z}{dt^2}k \quad (2)$$

where $r_0$ is the inner radius of the quadrupole arrangement. This leads to the following differential equations for Y and z:

$$\frac{d^2y}{dt^2} - \frac{2e}{mr_0^2}(U_{dc} + U_0 \cos wt)y = 0 \quad (3)$$

$$\frac{d^2z}{dt^2} + \frac{2e}{mr_0^2}(U_{dc} - U_0 \cos wt)z = 0 \quad (4)$$

Both are of the form of Mathieu's equation:

$$(d^2\zeta/d\theta^2 + (a - 2q \cos 2\theta)\zeta = 0 \quad (5)$$

the solution of which is given in "Theory and Application of Mathieu Functions", N.W. McLachlan, 1947, Claredon Press, London and New York, as:

$$\zeta = A \exp(\mu\theta)\sum_{-\infty}^{+\infty} c_\nu \exp(i\nu\theta)$$

$$+ B \exp(-\mu\theta)\sum_{-\infty}^{+\infty} c_\nu \exp(-i\nu\theta) \quad (6)$$

This can applied for $\zeta$ being either y or z. In the case of the y coordinate (equation (3))

$$a = a_y = -(8eU_{dc}/r_0^2 mw^2) \quad (7)$$

and in the case of the z coordinate (equation (4))

$$a = a_z = +(8eU_{dc}/r_0^2 mw^2) \quad (8)$$

and in both cases $$q = (4eU_0/r_0^2 mw^2) \quad (9)$$

which results from the fact that the time operator $d^2/dt^2$ has to be replaced by the operator $(w^2/4)(d^2/d\alpha\frac{1}{2})$, since $\theta = wt/2$. The characteristic exponents $\mu$ of the solution can be determined from $a$ and $q$. But in order that y and z may be real, $\mu$ has to be purely imaginary of the form $\mu = (b/d)i$, where $b$ and $d$ are integral numbers. The upper limits for $a_z$ and the lower limits for $a_y$ are given by $$a_y = -BA^2U_0^2\left(1/2 - \frac{7A^2U_0^2}{128}\right) \quad (10)$$

and $$a_z = B\left(1 - AU_0 - A^2U_0^2 + \frac{A^2U_0^2}{64} - \frac{A^4U_0^4}{1536}\right) \quad (11)$$

where $A = 1.77 (10r_0\nu)^{-2}$; $B = 28r_0^2\nu^2$; $r_0$ is in meters; $\nu$ is in MHz; and $U_0$, $a_y$ and $a_z$ are in volts.

For example, in a gauge using a frequency of $\nu = 200$ MHz, the ratio of the peak voltage $U_0$ and the superimposed dc voltage $U_{dc}$ can be determined. For electron focusing when $a_y = a_z$ the ratio $U_0/U_{dc}$ equals 6.05. This means that for a peak voltage of $U_0 = 160$ v, the DC potential should be $U_{dc} = 27$ v. Values of $a_y$ and $a_z$ under these conditions are represented by the two curves in FIG. 3. In these curves $a_y$ and $a_z$ are given in units of $U_{dc}$ as a function of the peak voltage $U_0$ for electrons and for a high frequency of $\nu = 200$ MHz as applied to the rods. In order, then, that only electrons remain on a stable trajectory, the gauge should be operated at values close to the two points of the two curves which yield $a_y = -a_z$. It will be seen that this is the case approximately at $U_0 = 160$v, which then fixes the value for $U_{dc}$ at 27v. For values of $U_0 > 160$v, one can still have stable trajectories for electrons, but other charged particles with higher masses M may also become stable. The DC potential $U_{dc}$ then to be applied can be determined from the intersection of the line, as given by $U_{dc} = -\gamma U_{o1}$, with the lower curve of FIG. 3. $\gamma$ is smaller than 0.166 and $U_{o1}$ varies between $O$ and $U_o$. From the corresponding value for $U_{o1}$ one can find the range of masses up to which stable conditions exist. All charged particles with atomic weights smaller than $$A = 5.45 \times 10^{-4} U_0/U_{o1} \quad (12)$$

then fulfill these conditions for a device constructed in accordance with the present invention with $r_0 = 1$ cm and using $\nu = 200$ MHz. For ions with $A = 1$ (hydrogen), a ratio of $U_0/U_{dc} \cong 1,840$ would be necessary, which shows that with $\gamma < 0.166$ practically only electrons will oscillate under stable conditions. Owing to the long electron path, the number of ions produced will be much higher than in prior ionization gauges.

The device may be tuned for the maximum collector current which coincides with the theoretical relationship for best electron focusing, however, the electrodynamics will only be valid if electrons are free to move. As soon as the electrons hit a gas atom or molecule, they will deviate from the desired movement. Under ideal conditions the unperturbed electrons will move indefinitely back and forth along the trajectories. The number of unperturbed electrons will increase as the pressure decreases. At pressures of $10^{-13}$ torr an electron will have a mean free path of approximately $10^{11}$ cm in dry air. An electron of such a long mean free path will travel back and forth in the tube as long as "8 min" until it suffers a collision which could lead to ionization. Assuming a 10% probability for such an event at a pressure of $10^{-13}$ torr, ion currents of the order of microamperes can be expected. Calibration measurements conducted with this quadrupole ionization gauge have obtained such high currents at the collector screen.

CALIBRATION

The system used in calibrating the quadrupole ionization gauge is shown in FIG. 4. The system comprises a vacuum chamber 20 having an inlet 21 from the atmosphere controlled by a needle valve 22 and an outlet 23 controlled by a main valve 24. The vacuum was produced with an ion pump 25 connected to the outlet 23 and backed up by a sorption pump 26. The ion pump used was an Ultek Boostivac ion pump commercially obtainable from Perkin-Elmer Corporation, Norwalk, Connecticut. A conventional ionization gauge 27 was connected to the chamber 20 along with the quadrupole ionization gauge 28. The conventional gauge used was a Redhead Ionization Gauge commercially obtainable from National Research Corporation, Cambridge, Massachusetts. The entire system was constructed with stainless steel flanges which were sealed with copper rings and Granville-Phillips type bakeable valves. It was therefore possible to bake the system at 400° C. The quadrupole ionization gauge 28 was calibrated using dry air and argon at room temperatures. Two different procedures were used during calibration. One with a static closed system and the other with a dynamic system where an equilibrium between pumping speed and gas inlet was maintained to establish a certain pressure.

In the first procedure, before calibration, the main valve 24 was closed to disconnect the system from the ion pump 25. The needle valve 22 was then used to let the gases into the system in steps up to a certain pressure. For each step, after stabilizing, the pressure was read on the Redhead Ionization Gauge 27 and the optimum collector current as indicated on meter 12 was noted.

In the other procedure, the system was calibrated by leaving the main valve 24 open and having the needle valve 22 throttled until a certain pressure was stabilized due to the continuous pumping of the ion pump 25. Again, a number of pressure points were established and the Redhead Ionization Gauge 27 and the quadrupole gauge meter 12 were read. Various calibration curves were plotted and no noticeable differences were noted between them and those of the former procedure other than a slight spread of the measured points due to the slight pumping action.

IONIZATION GAUGE

In the earliest form of quadrupole ionization gauge tested, the cathode 3 was used as the ion collector electrode. As shown in FIG. 1a, cathode 3a was connected to the negative terminal of a battery 11 a so as to make its potential negative with respect to cathode 2a and the screen 10 was used merely as a shield and grounded along with the positive side of the cathode power supply 18a. The quadrupole electrodes and the anode were connected as shown in FIG. 1. The gauge constant $C$ for this arrangement as defined by $Cp=i^+/i^-$, that is, the conditions under which the ion current $i^+$ was proportional to the pressure $p$ and the electron current $i^-$, was determined before the high frequency generator was set in operation. Under these DC conditions with the quadrupole rods only at potential $U_{dc}$, the constant did not exceed a value of $C=50$ torr$^{-1}$. This is a factor of 10 higher than presently used ionization gauges so that this early gauge in DC operation was 10 times as sensitive as the ionization gauges of the prior art.

When an alternating field having a frequency $\nu = 200$ MHz was applied to the quadrupole electrodes, using the operating parameters $U_o = 160$v, $U_{dc} = 27$v, for an optimum collector potential $U_s = -19.5$v a gauge constant having the value $C=10^4$ torr$^{-1}$ was determined. Thus, an ionization gauge of an even greater sensitivity was achieved using an RF field.

However, even more startling results were obtained with an ionization gauge of the preferred form shown in FIG. 1 wherein the shielding screen 10 is used as the ion collector. While in the DC mode of operation, with similar operating parameters, the sensitivity of this gauge (FIG. 1) was equivalent to the earlier model (FIG. 1a) but when the RF voltage with $\nu = 200$ MHz was applied to the quadrupole electrodes the collector current, as read on meter 12, was found to increase with decreasing pressure within the range from $10^{-5}$ to $10^{-10}$ torr according to the relationship $p(i^+)^n=c$.

Figure 5:
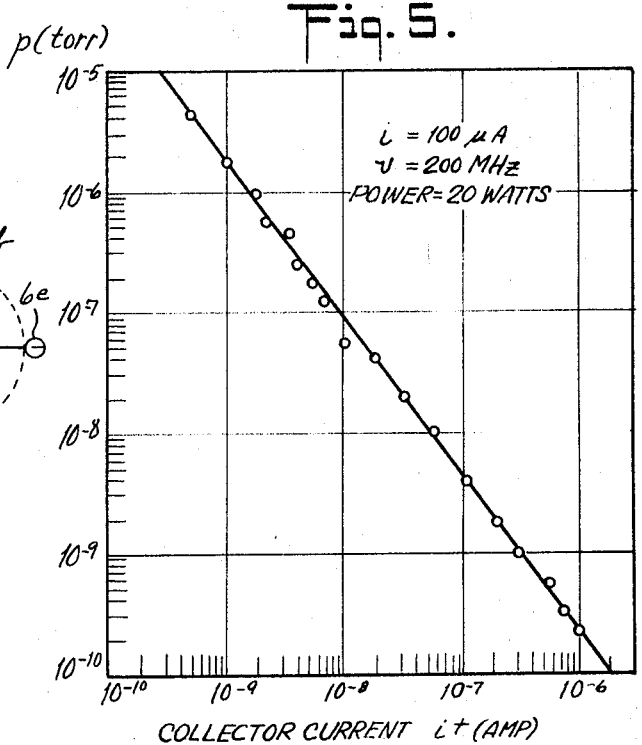
FIG. 5 is a calibration curve of the ionization gauge of FIG. 1, suing a quadrupole RF field of approximately 20 watt power.
Figure 6:
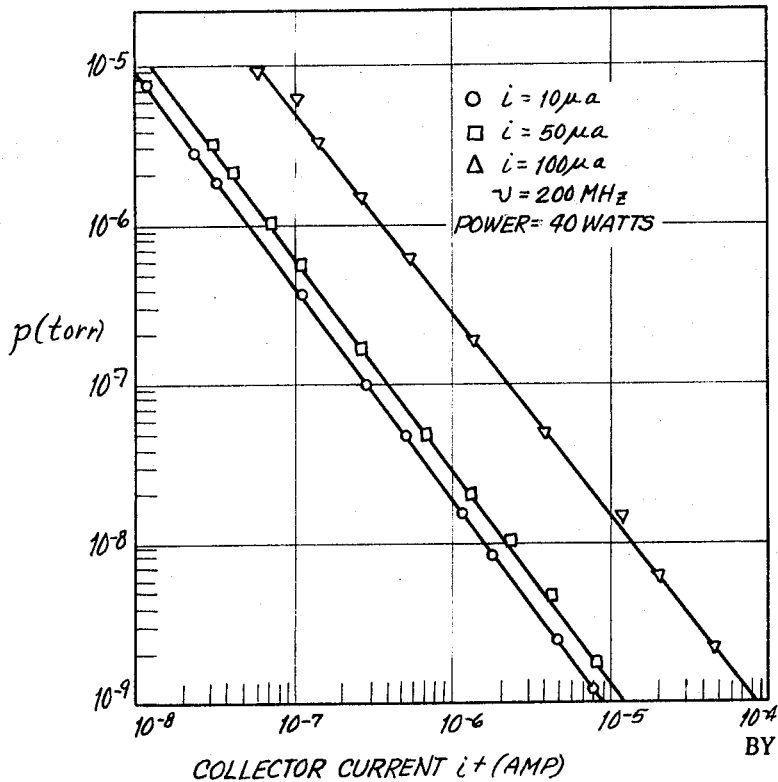
FIG. 6 is a calibration curve of the ionization gauge of FIG. 1, using a quadrupole RF field of approximately 40 watt power.

Calibration curves were measured using this gauge (FIG. 1) at different high frequency power inputs and different electron emission currents and are shown in FIGS. 5 and 6. FIG. 5 corresponds to a calibration at an initial electron emission of 100$\mu$A and a high frequency power of about 20 watts. FIG. 6 depicts three calibration curves at three different electron emission currents of 10, 50 and 100$\mu$A and a higher high-frequency power input of about 40 watts.

By adjusting the power supply 18 for heating the filament 2, the emission current was set with only the dc potential on the quadrupole rods 6a, 6b, 7a, 7b. Switch 30 in line 31 was then opened and the high frequency voltage was applied. After applying the high frequency with the correct peak potential, the emission current ($i^-$) as measured at the amperemeter 9 dropped down to between 1 and 10 percent of its initial value. This would seem to indicate that due to electron focusing and oscillation, a negative space charge built up and prevented further electron emission from the cathode 2. A high alternating current existed within the center of the tube 1. The fact that the emission current dropped to such a low value also indicates that very few electrons of high energy struck solid parts within the tube 1.

The exponent n of the equation $p(i^+)^n = c$ was determined for the respective curves, as well as the constant $c$, and the values are listed in the following table, where $p$ is measured in torr and ($i^+$) collector current is measured in amperes.

| Figure | $i$-(UA) | n | c |
|---|---|---|---|
| 5 | 100 | 1.30 | $3.88 \times 10^{-18}$ |
| 6○ | 10 | 1.31 | $2.88 \times 10^{-17}$ |
| 6□ | 50 | 1.33 | $2.63 \times 10^{-16}$ |
| 6△ | 100 | 1.29 | $5.37 \times 10^{-15}$ |

As can be seen from FIGS. 5 and 6, the inverse pressure dependence held in the range from $10^{-5}$ to $10^{-10}$ torr without any indication that the collector current will decrease with decreasing pressure.

This inverse mode of operation is of extreme advantage for measuring very low pressures since currents in the range of microamperes are being measured. Thus, the insulation problems inherent in most ionization gauges where currents in the order of $10^{-15}$ amperes and lower have to be measured or amplified are obviated with this gauge. It has been found that collector currents in the order of microamperes can be obtained at pressures as low as $10^{-10}$ torr with an electron emission of 100 microamperes which corresponds roughly to an ionization yield of $10^7$ ions/cm/torr. Such a high ionization yield indicates a high pumping speed in the lower pressure range so that the gauge can be readily adapted for use as an ultra-high vacuum ion pump.

Ion Pump

Figure 7:
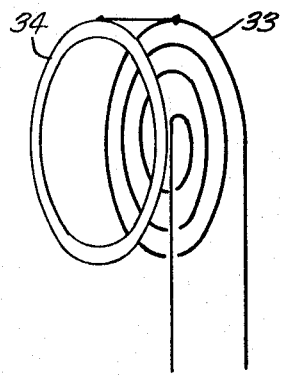
FIG. 7 is a diagrammatic view of a modification of the reflector cathode of the gauge of FIG. 1 to permit its use as an ion pump.

In the ion pump mode of operation, the cathode 3 of the gauge shown in FIG. 1 is modified to consist of a mesh made of titanium or alternatively a narrow spiral of titanium wire 33, either of which may be heated to produce titanium vapor that can be available for getter action. As shown in FIG. 7, a flat ring 34 is positioned immediately in front of the spiral cathode 33 and set at the same potential.

When the quadrupole optics are properly tuned, the electrons, as in the ionization gauge, will follow a narrow spiral and reach their maximum axial velocity when passing through the anode ring 5. They are then slowed down by the inverted field of the cathode 3 and are given a reverse acceleration thereby. The free electron path will thus be a very long oscillating spiral and will only end its free movement when colliding with a gas atom. At very low pressures, for example, $10^{-12}$ torr, the path may be as much as $1^{-10}$ cm.

In constructing an ion pump, the operating parameters are again chosen so that only electrons are focused by the quadrupole field. A formula for the frequency of such a field in terms of the maximum voltage $U_o$ of the high frequency generator 8, the internal quadrupole electrode radius $r_o$, and the mass of the charged particle m is given by the relationship $$\nu = 1.03 \times 10^{-10} \frac{1}{r_0} \left(\frac{U_0}{m}\right)^{1/2} \quad (13)$$

where the frequency is in Hertz when $U_o$ is in volts, $r_o$ is in meters, and $m$ is in kilograms. For an electron, the above formula reduces to $$\nu = 1.08 \times 10^5 r_o^{-1} U_o^{1/2} \quad (14)$$

A suitable maximum voltage $U_o$ for the generator 8 is, for example, 5,000 volts and using an internal electrode radius $r_o = 10$ cm, a frequency of $= 76.5$ MHz, will be required. With such an arrangement, the electrons will stay in the center of the quadrupole while all other charged particles will end up on the walls. The length of the ion pump discharge tube should be made such that the time-of-flight of the electrons is long in comparison to the duration of a higher frequency period. From the equations of motion that determine the electron path, the dc potential $U_{dc}$ which must be imposed on the anode ring 5 can be calculated. For optimum electron focusing the ratio between the peak voltage $U_o$ of the high frequency generator 8 and the dc voltage $U_{dc}$ of the anode 5 is given by $$U_{dc} = 0.17 U_o \quad (15)$$

this will require a DC voltage of 850 volts to achieve optimum operation with the other parameters given.

With this ion pump, a sorption pump may be used as fore-vacuum pump (in the manner shown in FIG. 4) and provisions should be made for very wide fore-vacuum connections at both ends of the tube and at the walls where the ions arrive with velocities up to 850 eV. Since this is, of course, much faster than the thermal motion, in addition to the getter-ion "-pumping" action, a real-ion pumping action will also occur. This is an important feature of the present ion pump.

In all known ion pumps now in use, the gas molecules are really not being pumped out of the system but they are rather being absorbed at the walls that are made fit for such a process by evaporation of getter materials. However, a real pump should be one where the molecules to be pumped will completely leave the system, that is, for example, as shown in FIG. 4, the ionized gas atoms and molecules will leave the pump 25 completely and will be pumped out of the vacuum system by the forepump 26 into the atmosphere. This is possible when the ion flux towards the fore-vacuum is larger than the back streaming of neutral molecules. With the high-ion velocities and greater ion production efficiency obtainable with the present device, it is possible to achieve such a real pumping action. Such a pumping action makes the device especially suitable for noble gas pumping which has always been a problem for getter-ion pumps and in addition the danger of re-emitting the pumped gas is reduced.

If it is desired to increase the efficiency of the present device, several sets of electrodes can be inserted within a single casing parallel to each other and the high frequency power may be transmitted using opposite pairs of rods as the transmission lines. The different sets of electrodes or cells can then be connected in series with each other as shown in FIG. 8, with the negative electrodes 6a–6e and the positive electrodes 7a–7d commonly connected. A single one of these cells (6a, 6b, 7a, 7b) with the above-indicated electrical characteristics has been found to have a pumping speed of at least 15 liters per second so that very high pumping speeds are obtainable with the arrangement of the present invention.

A nonmagnetic ionization gauge is thus presented which is many orders of magnitude more sensitive than the gauges of the prior art and which may be operated in such manner as to obtain a calibrated current in inverse relationship to the measured pressure within the pressure range from $10^{-5}$ to $10^{-10}$ torr, and below, and which in an enlarged version may be adapted to operate as an ion pump capable of pumping speeds far beyond those obtainable with existing ion pumps. The device achieves strong focusing of electrons using only electric fields thus obviating the need for any magnetic components.

I claim:

1. A non-magnetic ionization device comprising:
   a. means for producing an oscillating stream of electrons;
   b. means for producing an electric field for focusing and confining said stream in continuous oscillation within a substantially restricted path and for expelling from said path ions resulting from the collision of said electrons with atoms in said path; and
   c. means disposed about said field-producing means for collecting the ions expelled from said path.

2. A device as in claim 1 wherein said electric field-producing means comprises a set of quadrupole electrodes.

3. A device as in claim 1, wherein said stream-producing means comprises spaced cathodes, and an anode disposed between and at a positive potential relative to said cathodes and wherein said electric field-producing means comprises quadrupole electrodes arranged about an axis defined by said stream and at substantially the same potential as said anode.

4. A device as in claim 3 wherein said quadrupole electrodes are supplied with a high frequency voltage $U_0 \cos \omega t$ for creating an electric field whose respective components along the Y and Z axes through the opposite pairs of electrodes are of the form $$\frac{d^2y}{d\theta^2} + (a_y - 2q \cos 2\theta)y = 0$$

$$\frac{d^2z}{d\theta^2} + (a_z - 2q \cos 2\theta)z = 0$$

$$a_y = -\frac{8eU_{dc}}{r_0^2 m \omega^2}$$

$$a_z = +\frac{8eU_{dc}}{r_0^2 m \omega^2}$$

$$q = \frac{4eU_0}{r_0^2 m \omega^2}$$

$U_{dc}$ being the anode voltage, $r_0$ being the inner radius of the quadrupole electrodes, $e/m$ being the charge to mass ratio of an electron and $$a_y \geq BA^2U_0^2 \left(1/2 - \frac{7a^2U_0^2}{128}\right)$$

$$a_z \leq B\left(1 - AU_0 - A^2U_0^2 + \frac{A^2U_0^2}{64} - \frac{A^4U_0^4}{1536}\right)$$

where $A = 1.77 (10r_0\nu)^{-2}$; $B = 28 r_0^2\nu^2$; $r_0$ is in meters; $\nu$ is the operating frequency in MHz; and $U_0$, $a_y$ and $a_z$ are in volts.

5. A device as in claim 3 wherein said ion collecting means comprises one of said cathodes at a negative potential relative to the other cathode.

6. A device as in claim 3 wherein said ion collecting means comprises an annular electrode disposed about said quadrupole electrodes and at a negative potential relative thereto.

7. A device as in claim 3 wherein one of said cathodes comprises a metallic electrode heated to produce a vapor for getter action.

8. An ionization gauge comprising:
   a. two spaced electrodes;
   b. a third electrode disposed between said spaced electrodes and at a positive potential relative to each and having an opening therein to permit a stream of electrons to follow an oscillating path between said spaced electrodes for ionizing atoms in said path;

wherein the improvement comprises:
   c. quadrupole electrode means disposed about said path at approximately the same potential as said third electrode and having a high frequency voltage impressed thereon for confining said electron stream within said path and expelling ions resulting from the ionization of atoms in said path; and
   d. a cylindrical electrode surrounding said quadrupole electrode means and at a negative potential relative thereto for collecting the ions expelled from said path.

9. An ion pump comprising:
   a. a first heated cathode for emitting a supply of electrons;
   b. a second heated cathode for producing a vapor for gettering action;
   c. an anode disposed between said first and second cathodes and at a positive potential relative to each;
   d. a set of quadrupole electrodes disposed about an axis defined by said cathodes and said anode and at substantially the same potential as said anode and having a high frequency voltage impressed thereon for setting up an electric field tending to focus said supply of electrons along a confined oscillating path and to expel any ions in said path; and
   e. means for collecting said expelled ions.

10. An ion pump as in claim 10, wherein the high frequency voltage has a frequency of $1.08 \times 10^5 r_0^{-1} U_0^{1/2}$ Hertz $r_0$ being the internal quadrupole electrode radius in meters and $U_0$ being the maximum voltage in volts.

* * * * *

UNITED STATES PATENT OFFICE
CERTIFICATE OF CORRECTION

Patent No. 3,665,245              Dated May 23, 1972

Inventor(x) Helmut J. Schwarz

It is certified that error appears in the above-identified patent and that said Letters Patent are hereby corrected as shown below:

Page 1, Col. 1, line 70, "on" should read --in--;

Col. 2, line 12, "suing" should read --using--;

Page 2, Col. 3, line 35, Equation 5 should read:

$$d^2\zeta/d\theta^2 + (a-2q \cos 2\theta)\zeta = 0$$

line 54, the operator should read:

$$(w^2/4)(d^2/d\theta^2).$$

Page 3, Col. 5, line 71, "i-(UA)" should read --$i^-(\mu A)$--;

Page 4, Col. 7, claim 4, the symbol for frequency, $\omega$ should read so as to conform to the symbol for frequency w used in Column 3 of the specification;

claim 10, the dependency should be on claim 9.

Signed and sealed this 12th day of September 1972.

(SEAL)
Attest:

EDWARD M. FLETCHER, JR.            ROBERT GOTTSCHALK
Attesting Officer                   Commissioner of Patents